(12) United States Patent
Chung et al.

(10) Patent No.: US 9,782,978 B2
(45) Date of Patent: Oct. 10, 2017

(54) SERPENTINE DIRECTION REVERSAL IN BIDIRECTIONAL ERROR DIFFUSION HALFTONING

(71) Applicant: Hewlett-Packard Development Company, L.P., Houston, TX (US)

(72) Inventors: Bradley D Chung, Coirvallis, OR (US); Hsue-Yang Liu, Vancouver, WA (US); Matthew A Shepherd, Vancouver, WA (US); Mark H MacKenzie, Corvallis, OR (US); Jason M Quintana, Brush Prairie, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/313,161

(22) PCT Filed: May 29, 2014

(86) PCT No.: PCT/US2014/039948
§ 371 (c)(1),
(2) Date: Nov. 22, 2016

(87) PCT Pub. No.: WO2015/183275
PCT Pub. Date: Dec. 3, 2015

(65) Prior Publication Data
US 2017/0151808 A1    Jun. 1, 2017

(51) Int. Cl.
*B41J 2/21*        (2006.01)
*B41J 2/01*        (2006.01)
(Continued)

(52) U.S. Cl.
CPC .............. *B41J 2/2121* (2013.01); *B41J 2/01* (2013.01); *B41J 2/145* (2013.01); *B41J 2/155* (2013.01);
(Continued)

(58) Field of Classification Search
CPC ..... B41J 2/01; B41J 2/145; B41J 2/155; B41J 2/175; B41J 2/2121; B41J 2/2146;
(Continued)

(56) References Cited

U.S. PATENT DOCUMENTS 6,234,605 B1 *  5/2001  Hilton .................... B41J 2/15
                                                    347/13
6,331,038 B1   12/2001  Boleda
(Continued)

FOREIGN PATENT DOCUMENTS

WO    WO-2012166112    12/2012

OTHER PUBLICATIONS

Lee, J-H., et al., Inkjet Printer Model-based Halftoning, IEEE Transactions in Image Processing—May 2005, vol. 14, No. 5—16 pages.

*Primary Examiner* — Anh T. N. Vo
(74) *Attorney, Agent, or Firm* — Law Office of Robert C. Sismilich

(57) ABSTRACT

A printer includes a printbar having plural dice partially overlap in the direction of rows and a halftoner. The dice receive nozzle firing data which determines when and where the individual print nozzles are to be operated in order to emit the colorant onto the media so as to form the desired printed image on a media. The halftoner is a bidirectional error diffusion halftoner that is structured to generate halftoned data. The halftoned data is mappable into the firing data. The halftoner includes a serpentine direction reverser which is structured to halftone print data image pixels in a first serpentine direction to form halftoned data and then to halftone print data image pixels in an opposite serpentine direction to form the halftoned data.

15 Claims, 10 Drawing Sheets

(51) Int. Cl.
  *B41J 2/505* (2006.01)
  *B41J 2/155* (2006.01)
  *H04N 1/23* (2006.01)
  *B41J 19/16* (2006.01)
  *B41J 2/145* (2006.01)

(52) U.S. Cl.
  CPC ............ *B41J 2/2146* (2013.01); *B41J 2/5056* (2013.01); *B41J 19/16* (2013.01); *H04N 1/233* (2013.01); *H04N 1/2307* (2013.01); *B41J 2202/20* (2013.01)

(58) Field of Classification Search
  CPC ...... B41J 2/5056; B41J 19/16; B41J 2202/20; H04N 1/2307; H04N 1/233
  See application file for complete search history.

(56) References Cited

U.S. PATENT DOCUMENTS

| | | | |
|---|---|---|---|
| 6,672,701 B1 | 1/2004 | Nunokawa | |
| 7,052,125 B2 | 5/2006 | Askren | |
| 7,140,710 B2* | 11/2006 | Marra, III | B41J 2/2056 347/15 |
| 7,524,007 B2 | 4/2009 | Pulver | |
| 7,566,111 B2 | 7/2009 | Silverbrook | |
| 8,542,409 B2* | 9/2013 | Wakayama | H04N 1/405 347/15 |
| 8,995,021 B2* | 3/2015 | Li | G06K 15/1881 358/1.9 |
| 2002/0167565 A1 | 11/2002 | Maeda et al. | |
| 2006/0103691 A1 | 5/2006 | Deetl et al. | |
| 2012/0212532 A1 | 8/2012 | Seccombe | |

\* cited by examiner

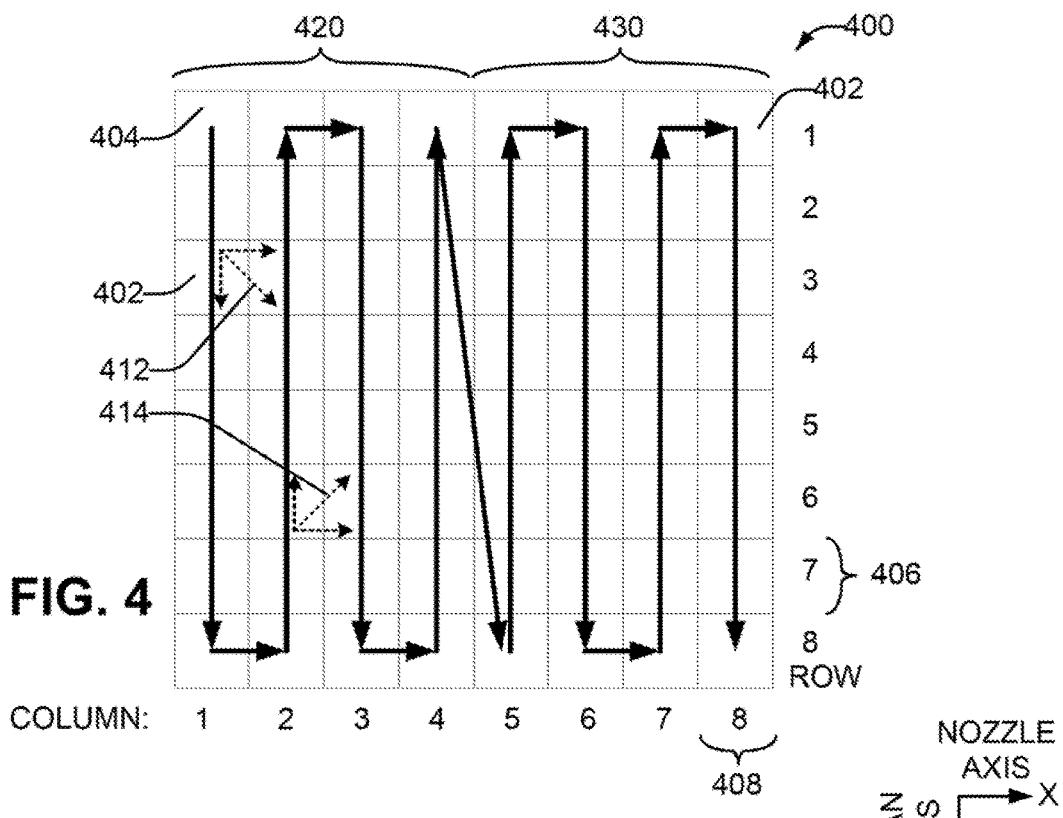
FIG. 4
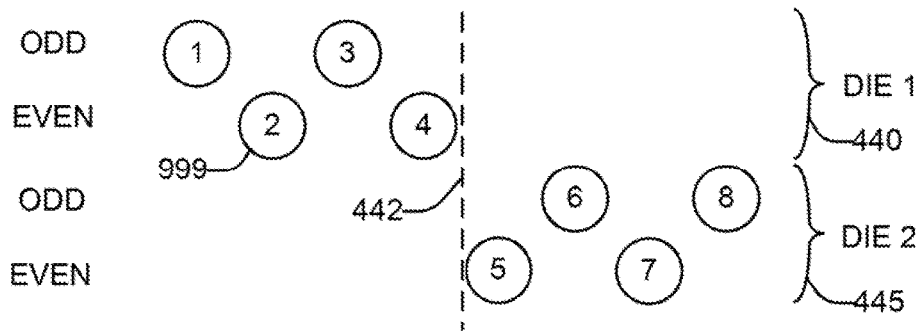
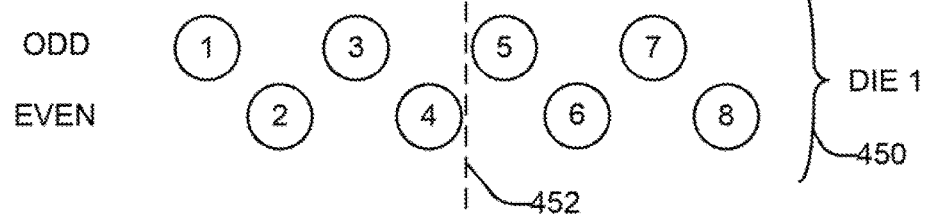

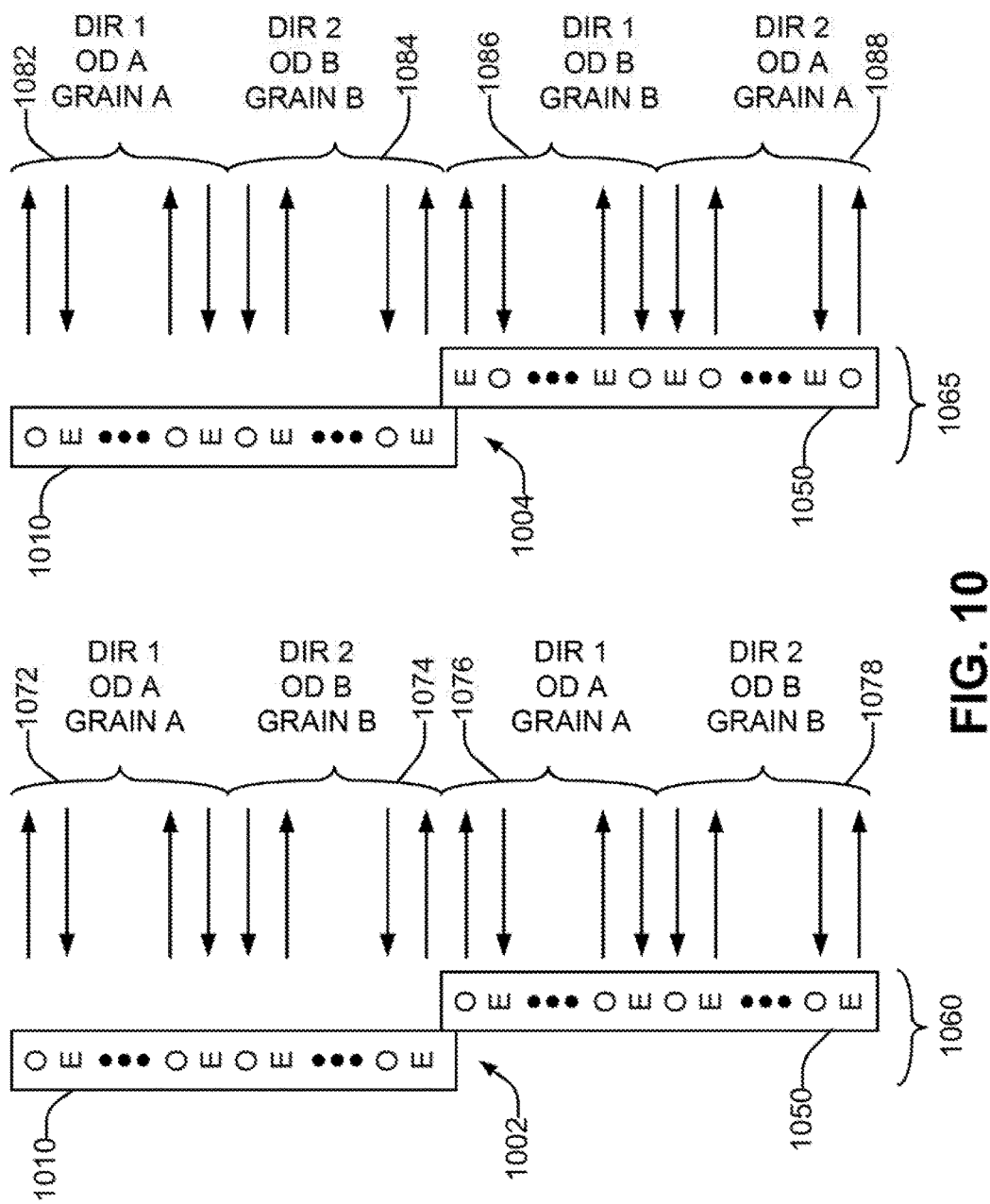

SERPENTINE DIRECTION REVERSAL IN BIDIRECTIONAL ERROR DIFFUSION HALFTONING

BACKGROUND

Page wide array inkjet printers can provide excellent throughput and print image quality. Many such printers include at least one printbar which can print the entire printable width of a media as the media flows past the printbar. Such printbars often comprise plural dies, each die having print nozzles that emit colorant onto the media during printing, and spanning a portion of the printable width. An alignment procedure may be performed to align the printed output of the various dies, which includes aligning the dies in the direction of the page width in order to achieve optimal image quality.

BRIEF DESCRIPTION OF THE DRAWINGS

FIG. 4 is a schematic representation of halftoning of print data image pixels according to an example of the present disclosure.

FIG. 10 is a schematic illustration in accordance with an example of the present disclosure of the halftoning operation for an example printbar according to the method of FIG. 9.

DETAILED DESCRIPTION

Figure 1:
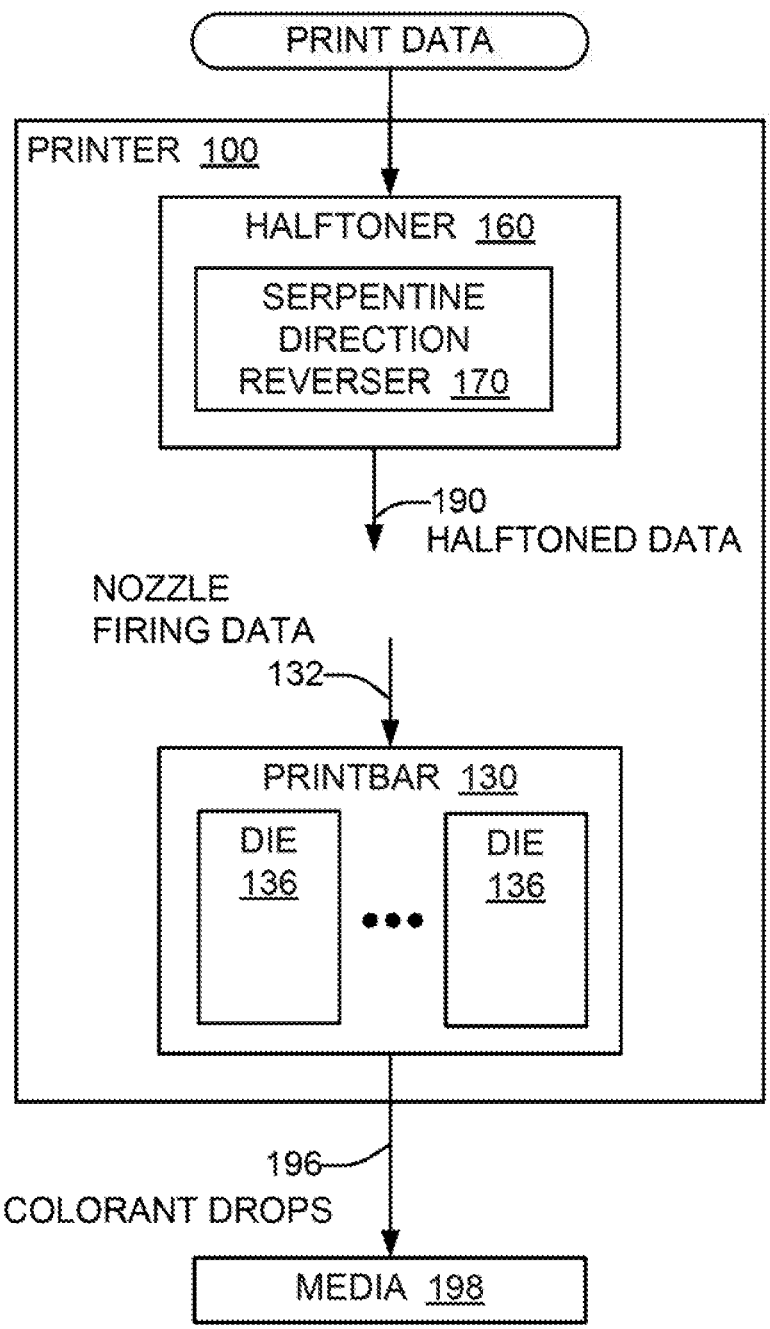
FIG. 1 is a schematic block diagram representation of a printer including a halftoner according to an example of the present disclosure.

The die-to-die alignment of dies in a printbar effectively "stitches" the printed image together across the die boundaries. To achieve optimal image quality for the printed image, regions of the media printed with one die and regions printed with an adjacent die should have substantially the same visual characteristics. Two such characteristics are optical density and grain. In the context of inkjet printing, optical density (also called absorbance, or just density) may be defined as the negative logarithm of the ratio of a radiation metric:incident light to reflected light. For a given ink, optical density may in large part be determined by the total area of a given region of printed media that is covered by a colorant. Grain refers to the general perception to an observer of the granular structure, such as discrete areas of colorant, on the printed media. The perception may be affected by colorant dot size, colorant dumping, or other effects. For certain die-to-die alignments, as discussed subsequently, a trajectory error in dot placement of a die may interact with bidirectional error diffusion halftoning of the print data image pixels and result in human-perceivable optical density and grain differences.

Referring now to the drawings, there are illustrated examples of printers and halftoning methods constructed in accordance with the present disclosure which reduce or eliminate the optical density and grain differences in dies with trajectory error, for any die-to-die alignment. This may be accomplished through reversal of the serpentine direction of bidirectional halftoning at appropriate points.

Considering now one example printer, and with further reference to FIG. 1, a printer 100 includes a printbar 130 and a halftoner 160. The printbar 130 includes at least two dies 136, each die 136 having parallel odd and even rows of staggered print nozzles that controllably emit colorant drops 196 onto a media 198 during printing. The plural dies 136 partially overlap in the direction of the rows, as discussed further with reference to FIGS. 2 and 3. The printbar 130, and the dies 136, receive nozzle firing data 132 which determines when and where the individual print nozzles are to be operated in order to emit the colorant onto the media 198 so as to form the desired printed image on the media 198. The halftoner 160 is a bidirectional error diffusion halftoner that is structured to generate halftoned data 190. The halftoned data is mappable into the firing data 132, as discussed subsequently with reference to FIGS. 4-5. The halftoner 160 includes a serpentine direction reverser 170. The serpentine direction reverser 170 is structured to halftone print data image pixels in a first serpentine direction to form halftoned data until a criterion is met, and then to halftone print data image pixels in an opposite serpentine direction to form the halftoned data after the criterion is met. The serpentine direction, its reversal, and the criterion discussed in greater detail subsequently with reference to FIG. 4.

Figure 2:
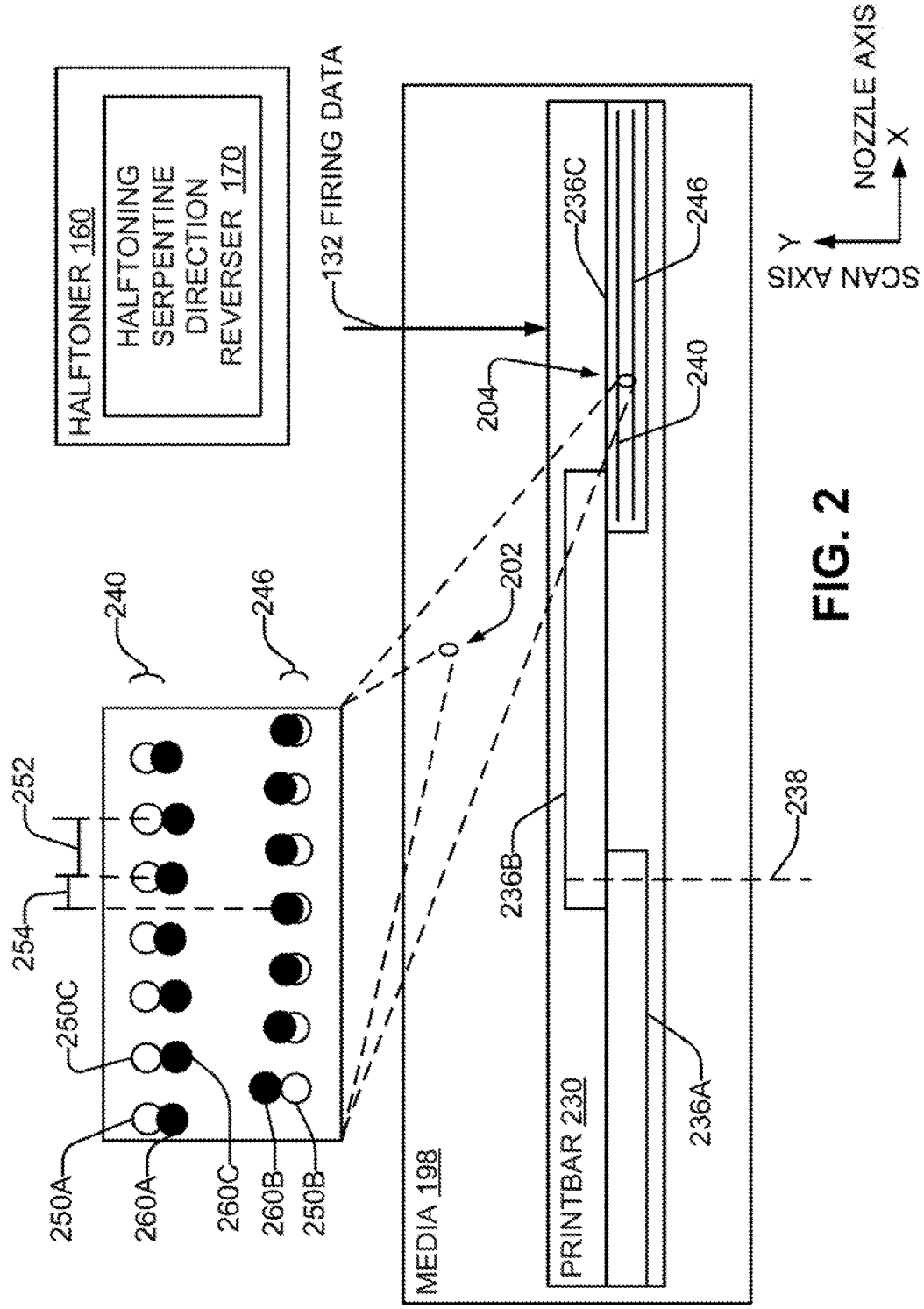
FIG. 2 is a schematic representation of a multi-die printbar according to an example of the present disclosure usable with the printer of FIG. 1.

Considering now in greater detail the printbar, and with reference to FIG. 2, an example printbar 230 usable with the printer 100 (FIG. 1) may include three dies 236A, 236B, 236C (collectively 236). The dies 236 collectively span the printable region of the media 198. Although for clarity the illustrated printbar 230 does not provide edge-to-edge coverage of the width of the media 198, it is understood that the printbar 230 may be lengthened to do so. During printing, the media 198 and/or the printbar 230 are moveable to position the printbar 230 so as to deposit colorant on any portion of the media 198. An X-Y coordinate system is defined for the printbar 230, with the X axis denoted as the nozzle axis, and the Y axis denoted as the scan axis. In one arrangement, the printbar 230 is stationary, and the media 198 flows past the printbar 230 in the direction of the scan axis during printing.

An example enlargement (not to scale) of a portion 202 of the printed media 198 is illustrated in FIG. 2, superimposed on a corresponding example enlargement (not to scale) of a portion 204 of the die 236C. Each die 236 includes two parallel rows 240, 246 of print nozzles 250A, 250B, 250C (collectively 250, illustrated in white) for the same color colorant, each row extending along the nozzle axis. The nozzles 250 are staggered between the two rows 240, 246.

Within a row 240, 246, the nozzles 250 are substantially evenly spaced linearly along the row, with adjacent nozzles along the row placed at a full-spacing 252. Accordingly, nozzles 250A and 250C are spaced at the full-spacing 252. The nozzles are staggered between the rows such that the spacing along the nozzle axis of adjacent nozzles 250 in each row is at a half-spacing 254, which is substantially one-half of the full-spacing 252. In one example, the full-spacing 252 is $\frac{1}{600}$th inch, while the half-spacing 254 is $\frac{1}{1200}$th inch. Staggering the nozzles 250 in this manner allows single-pass printing to be performed using the printbar 230 at a printing resolution of 1200 dpi (dots per inch) along the nozzle axis. The nozzles 250 of both rows 240, 246 may be numbered in order of their position along the nozzle axis. For example, nozzle 250A may be nozzle #1, nozzle 250B may be #2, and nozzle 250C may be #3. As such, row 240 may be considered the odd nozzle row, and row 246 the even nozzle row. In one example, a die 236 may comprise 1056 nozzles total between the two rows 240, 246. The nozzle axis may also be referred to as the direction of the rows.

In one example, some or all of the nozzles 250 may have a trajectory error in the direction of the scan axis (also referred to as a scan axis directionality error, or SAD error) that causes drops of colorant ejected from a nozzle 250 to deviate along the scan axis from its intended deposition position on the media when forming dots, such as example dots 260A, 260B, and 260C (collectively 260) produced by nozzles 250A, 250B, and 250C respectively. Each nozzle 250 may have a different SAD error. The SAD error for each nozzle 250 may be in either direction along the scan axis from the nozzle position. By taking the mean of the SAD errors for all the nozzles 250 in a row 240, 246, a mean SAD error of the nozzles in that row may be determined. The mean SAD error of dies may vary over time (such as over a period of months or years). However, all dies in a given printbar tend to have approximately the same mean SAD error, and vary in the same way over time, often because all the dies are from the same wafer or manufacturing lot.

Within the printbar 230, the dies 236 are staggered along the nozzle axis, and aligned relative to each other along the nozzle axis. In some configurations one or more die 236 may be physically repositioned along the nozzle axis for alignment, but often the dies 236 are each fixed in position along the nozzle axis but overlap by a certain amount. In this latter case, alignment may include determining which nozzles 250 should operate as the endmost (adjacent) nozzles of two adjacent dies 236 to achieve optimum print output image quality. Doing so has the effect of determining a die-to-die boundary 238 between the two adjacent dies 236. In one configuration, the dies 236 overlap by approximately 30 nozzles, and the boundary 238 is established as near to the midway point of the overlap as will achieve the optimum print quality.

While the two rows of nozzles for a single colorant are illustrated for clarity, it is noted that each die may include two rows of each of one or more additional colorants in parallel with rows 240, 246. For example, rows 240, 246 may emit black colorant, while additional pairs of rows might emit cyan, magenta, yellow, and/or other colorants.

Figure 3:
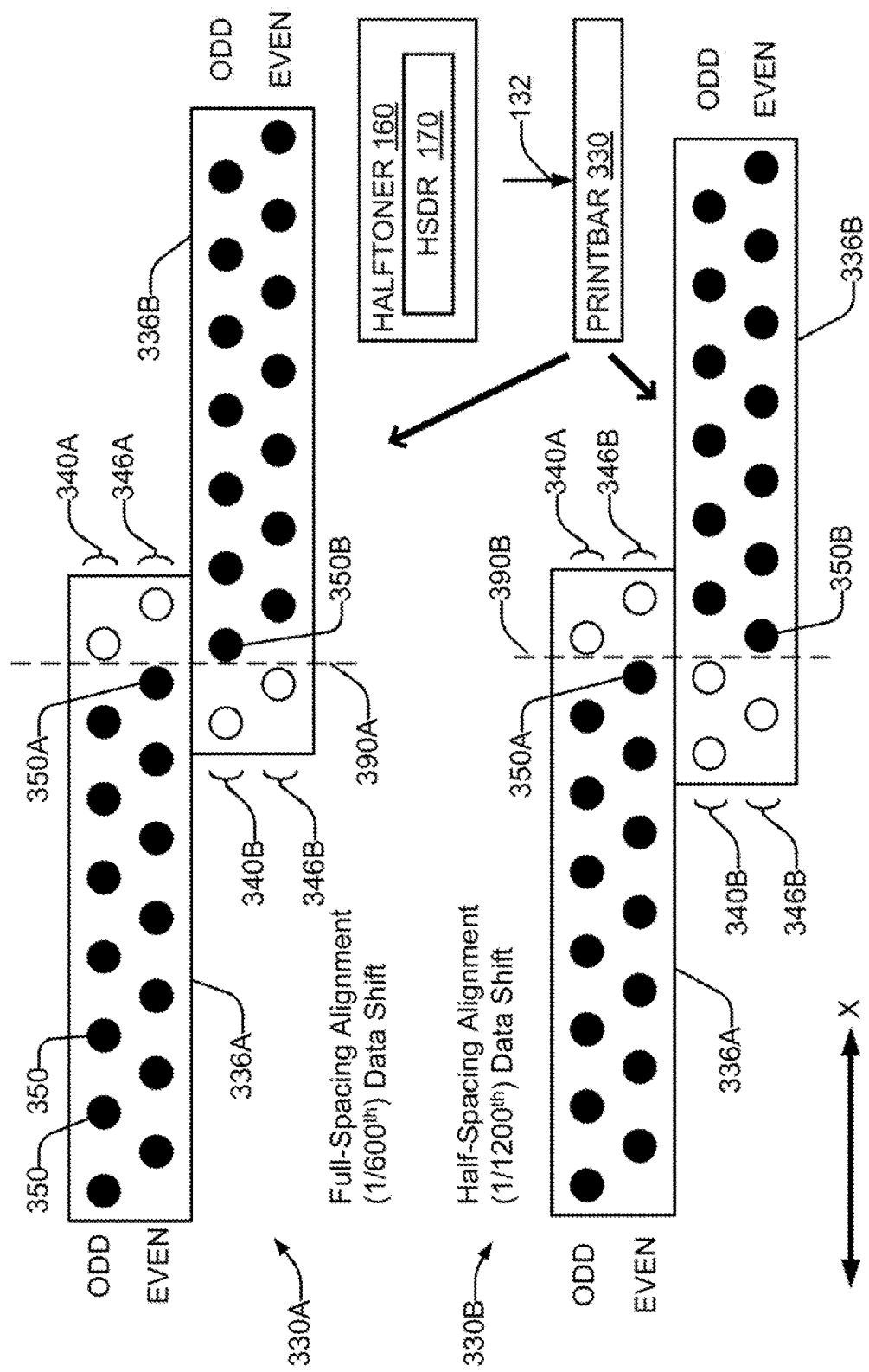
FIG. 3 is a schematic representation of relative die-to-die alignment within a multi-die printbar according to an example of the present disclosure usable with the printbar of FIG. 2.

Considering now in greater detail the relative die-to-die alignment of a multi-die printbar, and with reference to FIG. 3, two alternative alignment states 330A, 330B of a printbar 330 are illustrated. Two dies 336A, 336B within the printbar 330 are illustrated. Each die 336A, 336B has an odd row 340A, 340B and an even row 346A, 346B of nozzles 350, with the nozzles staggered (or offset) between the odd and the even rows by the half-spacing 254 (FIG. 2). For a single such die, dots of colorant may be deposited at locations on the media at the half-spacing 254 (FIG. 2) in the direction of the nozzle axis by interleaving the ejection of the colorant from odd ("O") and even ("E") nozzles—e.g. OEOEOEOE. The dies 336A, 336B are disposed in the printbar 330 so as to have a nominal nozzle overlap. Operative nozzles after alignment are illustrated with black circles, while inoperative nozzles after alignment are illustrated with white circles.

In the first alignment state 330A, the dies 336A, 336B are disposed relative to each other along the nozzle axis such that the optimal nozzle spacing between the dies 336A, 336B is obtained by choosing a last operative nozzle 350A of die 336A in even row 346A, and a first operative nozzle 350B of die 336B in odd row 340B. By doing so, the dots of colorant may be deposited at locations on the media at the half-spacing 254 (FIG. 2) in the direction of the nozzle axis across the die-to-die boundary 390A by interleaving the ejection of the colorant from odd ("O") and even ("E") nozzles across the boundary 390A—e.g. "OEOE|OEOE" (where "|" denotes the boundary, and where the boundary 390A is between the last operative nozzle 350A and the first operative nozzle 350B). It is noted that an alternate configuration where the last operative nozzle 350A of die 336A is in the odd row 340A and the first operative nozzle 350B of die 336B is in the even row 346B also results in the first alignment state 330A (in this case, the ejection pattern for the four nozzles on each die closest to the boundary is "EOEO|EOEO". In other words, the first alignment state 330A exists where the last operative nozzle 350A and the first operative nozzle 350B are in different nozzle rows of their respective die (i.e. one in an odd row, the other in an even row).

In the second alignment state 330B, the dies 336A, 336B are disposed relative to each other along the nozzle axis such that the optimal nozzle spacing between the dies 336A, 336B is obtained by choosing a last operative nozzle 350A of die 336A in even row 346A, and a first operative nozzle 350B of die 336B in even row 346B. But to achieve the half-spacing 254 deposition of colorant across the die-to-die boundary 390B, a different ejection pattern is used—"OEOE|EOEO". Thus the second alignment state 330B exists where the last operative nozzle 350A and the first operative nozzle 350B are in the same nozzle rows of their respective die. While FIG. 3 illustrates the nozzles 350A, 350B in even rows, it is noted that an alternate configuration where the last operative nozzle 350A of die 336A is in the odd row 340A and the first operative nozzle 350B of die 336B is in the odd row 340B also results in the second alignment state 330B.

In order to generate the proper nozzle firing data 132 for the dies 336A, 336B in the second alignment state 330B, the firing data 132 for nozzles of the odd and even rows of one of the two dies get swapped. In other words, during the mapping operation which transforms the halftoned data 190 (FIG. 1) into the nozzle firing data 132, firing data which otherwise would be directed to the nozzles of the odd row is instead directed to the nozzles of the even row. As discussed in more detail subsequently, this data swapping between rows in the second alignment state 330B can, under certain conditions, degrade the image quality of printed output unless compensated for.

The alignment state of the dies may be determined by performing a die-to-die alignment procedure and storing the results for use during printing. In some examples, a test pattern may be printed and then scanned by a sensor of the printer in order to determine the positions along the nozzle axis in the printbar 330 in which the dies are disposed. These positions may then be used to determine the die-to-die boundary between (and thus the alignment state of) each pair of dies.

Considering now the halftoning of print data image pixels, such as for example the halftoning operations performed by the halftoner 160, and with reference to FIG. 4, halftoning converts the print data image pixels from a continuous tone ("contone") digital data space to a halftoned (dot) data space. The value of image pixels represented in a contone data space have a larger range of allowable values, while image pixels represented in a halftoned data space have a smaller range of allowable values. In one example, contone pixels may be represented by 8-bit values per color, while halftoned pixels may be represented by 2-bit or 1-bit values per color. The colors often are device-dependent colors corresponding to the colorants of a printer. For an example four-color printer, the colors may be black, cyan, magenta, and yellow (referred to collectively as "KCMY"). The print data image pixels may have been previously converted (within or external to the printer) from contone image pixels in a device-independent color space such as, for example, RGB (red, green, blue) into the contone device-dependent contone image pixels.

One type of halftoning is error diffusion halftoning. In converting contone image pixels to halftoned image pixels, inaccuracies (surplus or deficit error) occur in the halftoned data due to the lower resolution of the halftoned pixels relative to contone pixels. Error diffusion halftoning accounts for this mathematically by distributing the surplus or deficit error to contone image pixels which have not yet been halftoned, thus diffusing the error to these pixels.

One type of error diffusion halftoning is bidirectional error diffusion ("BED") halftoning. In bidirectional error diffusion halftoning, for a page of print image pixels in row-and-column format, each column of the page is halftoned in the opposite direction from the prior column. This is referred to as "serpentine" halftoning.

Considering now the bidirectional error diffusion halftoning of a page 400 of print data image pixels 402 arranged in rows 406 and columns 408, eight columns 408 and eight rows 406 are shown for clarity of illustration. The halftoning begins from origin pixel 404, and proceeds in a first (or standard) serpentine direction 420 where the odd numbered columns 408 (e.g. 1, 3, 5, 7) are halftoned from top to bottom, and the even numbered columns 408 (e.g. 2, 4, 6, 8) are halftoned from bottom to top. In other words, adjacent columns 408 are halftoned in the opposite direction. As halftoning proceeds, error is diffused to adjacent image pixels in the direction 412 for columns 408 halftoned from top to bottom, while error is diffused to adjacent image pixels in the direction 414 for columns 408 that are halftoned from bottom to top. Halftoning continues in the first serpentine direction 420 until a criterion is met.

Then, after the criterion is met, halftoning proceeds in an opposite (or reverse) second serpentine direction 430. At the location where the reversal in serpentine direction occurs, two adjacent columns 408 (i.e. #4 and #5) are halftoned in the same direction due to the reversal. In some examples, and as discussed subsequently with reference to FIGS. 9-10, the halftoning continues in the reverse serpentine direction until the criterion is again met, after which the halftoning changes back to the standard serpentine direction. In other examples, and as discussed subsequently with reference to FIGS. 7-8, the halftoning continues in the reverse serpentine direction while the criterion continues to be met; and when criterion is no longer met, the halftoning direction is changed back to the standard serpentine direction.

As has been noted heretofore, the halftoned data is mappable into the firing data 132 (FIG. 1) for the print nozzles of the dies of a printbar. How this mapping is accomplished relates to the relationship, in the direction of the nozzle axis, between the halftoning resolution H and the printing resolution P. The relationship P/H defines the number of nozzles for which firing data is specified by a single halftoned image pixel. Where P is 1200 dpi and H is 1200 dpi, each halftoned image pixel specifies firing data for 1 nozzle. Where P is 1200 dpi and H is 600 dpi, each halftoned image pixel specifies firing data for 2 nozzles. Where P is 1200 dpi and H is 400 dpi, each halftoned image pixel specifies firing data for three nozzles.

FIG. 4 further illustrates operation based on two different criteria for serpentine direction reversal. For simplicity of illustration, consider the case where P/H=1, and thus each halftoned data pixel specifies firing data for one nozzle. In this case, each row 406 of image pixels, after halftoning, has a corresponding row of firing data that will be applied sequentially to a set of print nozzles. The firing data corresponding to each column 408 of image pixels is applied to the same print nozzle. In other words, the firing data corresponding to column #1 is applied to nozzle #1, etc. (It is noted that, while nozzles of a die are commonly numbered from 1 to N, the nozzle #'s denoted in FIG. 4 do not correspond to the nozzle numbering of a die. Rather, the numbers merely serve to link the illustrated nozzles to the firing data for the columns 408.)

A first criterion is that the image pixels being halftoned correspond to at least some print nozzles of a die which is aligned such that the firing data for the odd rows of print nozzles of the die and the firing data for the even rows of print nozzles of the die are swapped. Such a die has been described heretofore with reference to die 336B in the second alignment state 330B (FIG. 3). In FIG. 4, a non-data-swapped first die 440 corresponds to die 336A in the second alignment state 330B, and a data-swapped second die 445 corresponds to die 336B in the second alignment state 330B. The die-to-die-boundary 442 is established between the last operating nozzle (nozzle #4) of first die 440 and the first operating nozzle (nozzle #5) of second die 445. Since both nozzles #4 and #5 are disposed in even rows of their respective dies, data swapping will occur on the second die 445. When halftoning the image pixels of column #5, the halftoner knows that these pixels correspond to a nozzle in die 445 (specifically, nozzle #5) on which odd and even row data swapping is performed, and as a result the halftoner reverses the serpentine direction for column #5. Halftoning continues in the reverse serpentine direction for the image pixels which correspond to nozzles #6, #7, and #8, which are all disposed on the data-swapped second die 445 in addition to nozzle #5. Reversing the serpentine direction on the data-swapped second die 445 ensures that the image pixels for the even nozzles of both dies 440, 445 get halftoned in the same direction (i.e. bottom to top in FIG. 4), and that the image pixels for the odd nozzles of both dies 440, 445 also get halftoned in the same direction (i.e. top to bottom in FIG. 4). As a result, performing halftoning in this manner avoids or eliminates the printed output image quality degradation that results from the odd and even row data swapping, particularly in the presence of mean SAD trajectory error, which can result when the image pixel columns corresponding to odd rows (or to even rows) are halftoned in different directions in different regions of a printbar. The first criterion, and the halftoning technique described here, may be used for odd values of P/H.

A second criterion is that image pixels corresponding to a predetermined number of print nozzles of the printbar have been halftoned in the present serpentine direction since the last serpentine direction reversal occurred. Once this occurs, the serpentine direction is reversed from its current direction. Halftoning then continues in the new direction until the predetermined number of print nozzles of the printbar have been halftoned in the new serpentine direction since the serpentine direction reversal occurred. In FIG. 4, for simplicity of illustration, the predetermined number equals four, and nozzle #1 is the first nozzle halftoned in the first serpentine direction. In this example, the serpentine direction reversal to the opposite serpentine direction occurs at position 452 after the image pixels for nozzle #4 have been halftoned. Although not explicitly illustrated, the reversal back to the first serpentine direction occurs again after the image pixels for nozzle #8 have been halftoned. This halftoning technique is independent of any die-to-die boundary; serpentine direction reversal will occur at a die-to-die boundary if the boundary happens to independently coincide with the predetermined number of print nozzles. Performing halftoning in this manner reduces the human perceptibility of any print output image quality degradation that results from the odd and even row data swapping, particularly in the presence of mean SAD trajectory error, by periodically changing the direction (i.e. top to bottom, or bottom to top, in FIG. 4) in which the image pixels for odd rows (and for even rows) are halftoned. In some examples, image pixels for an approximately equal number of image pixel columns directed to odd rows (and even rows) are halftoned in each direction. In some examples, the predetermined number N for the number of print nozzles to halftone in a given serpentine direction before reversing the serpentine direction may be determined according to the formula N=D/S, where D is the total number of nozzles in an individual die of the printbar, and S is the number of serpentine direction segments desired in the die. In some cases, a value of S between 4 and 8 provides the optimal reduction in the human perceptibility of the image quality degradation. If N is an integer value, then a serpentine direction reversal will coincide with a die-to-die boundary. If N is a fractional value, it may be rounded to the nearest integer, and a serpentine direction reversal will not coincide with a die-to-die boundary.

The second criterion, and its halftoning technique of periodic serpentine direction reversal after halftoning N nozzles in a direction, may be used for even values of P/H. In some examples, this technique may be used if there is at least one die in the printbar which is aligned such that odd and even row firing data is swapped on it. If such data swapping does not occur on any die in the printbar, halftoning may be performed for image pixels of the entire printbar in the standard serpentine direction. In addition, although the ratio P/H is commonly an integer value, the second criterion could also be used if the ratio P/H were a non-integer value.

Figure 5:
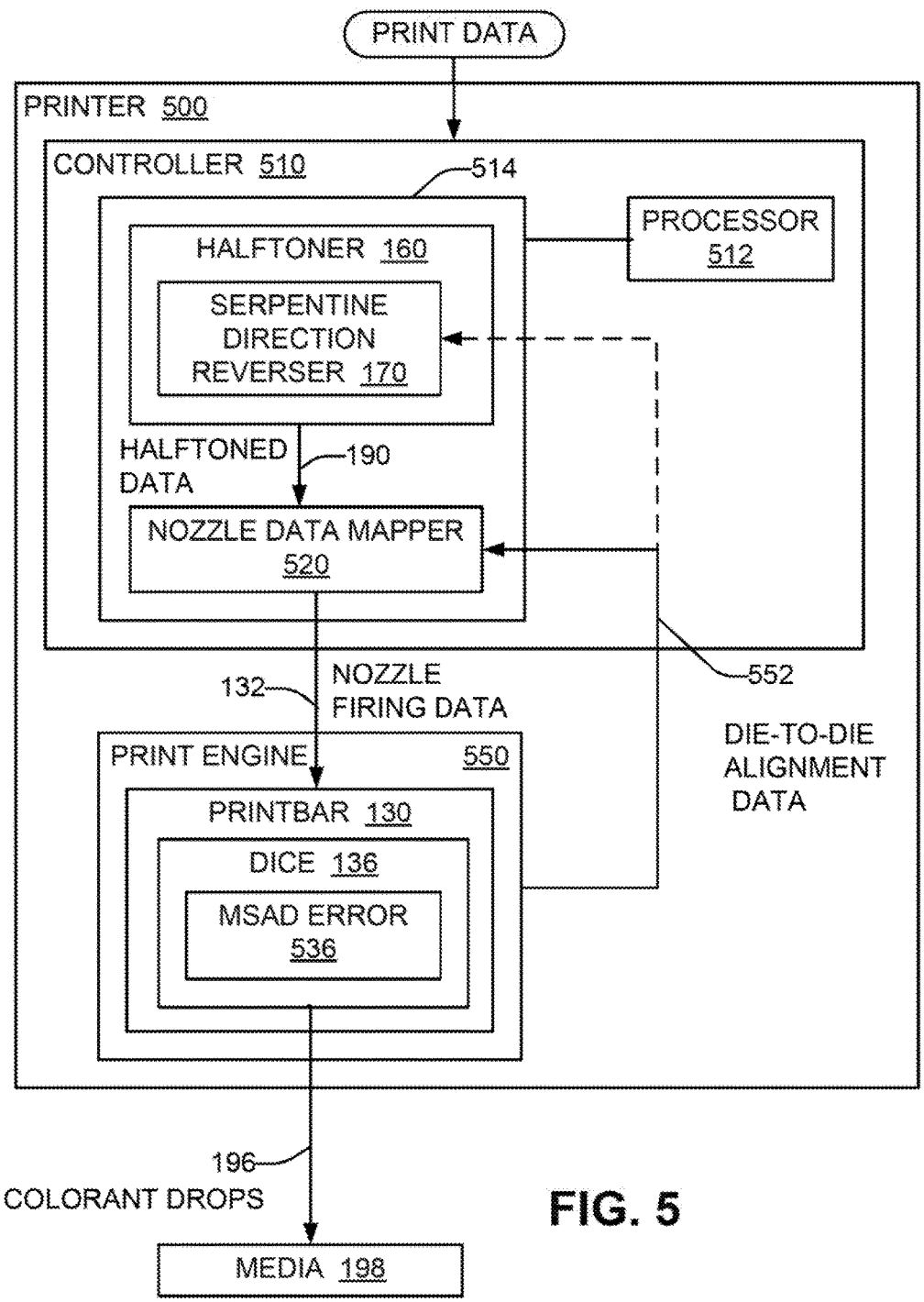
FIG. 5 is another schematic block diagram representation of a printer including a halftoner according to an example of the present disclosure.

Considering now another printer including a halftoner, and with reference to FIG. 5, a printer 500 includes a controller 510 communicatively coupled to a print engine 500. The controller 510 includes a halftoner 160 which includes a serpentine direction reverser 170 that generates halftoned data 190, as described heretofore. The controller 510 also includes a nozzle data mapper 520 which is structured to transform the halftoned data 190 into print nozzle firing data 132, including to controllably swap the firing data of the odd and even rows of a die when the die is aligned in the direction of the rows to an adjacent die by substantially half the nozzle-to-nozzle spacing 252 (i.e. the half-spacing 254) of a row, as has been described heretofore. In some examples, some or all of the controller 510 may be implemented in hardware, firmware, software, or a combination of these. In some examples where the controller 510 is implemented in whole or in part in firmware or software, the controller 510 may include a memory 514 having the firmware or software instructions, including instructions for the halftoner 160 and/or the nozzle data mapper 520, and a processor 512 which is communicatively coupled to the memory to access and execute the instructions.

The print engine 550 includes a printbar 130 having plural dies 136. The firing data 132 corresponds to the print nozzles of the various dies 136. The print nozzles of the dies 136 emit colorant drops 196 onto print media 198 to form the printed output. In some examples, the dies 136 may collectively have a mean SAD trajectory error 536 that tends to degrade the image quality of the printed output on the media 198. However, the methods and algorithms implemented by the halftoner 160 and the serpentine direction reverser 170 can reduce or eliminate the degradation, as has been described heretofore. Portions of the print engine 550 may also be implemented in hardware, firmware, software, or a combination, and may include an additional memory and/or processor.

The print engine 550 is further structured to align the dies 136 relative to each other in the direction of the rows of print nozzles on the dies (i.e. in the direction of the nozzle axis). The print engine 550 generates die-to-die alignment data 552 that is indicative of the relative positioning in the direction of the nozzle axis of each pair of dies (i.e. an alignment state of each pair). In some examples, the alignment data 552 is determined by performing a die-to-die alignment procedure, which may include printing a test pattern, and then optically scanning the printed test pattern. For example, a set of known image patterns disposed at known intended distances may be printed, and then the actual distances, or distance variations, measured on the printed output to determine the alignment data 552. The alignment data 552 is subsequently usable by the nozzle data mapper 520 of the controller 510 to select the endmost operating nozzles of each pair of adjacent dies, and thus define the die-to-die boundary between the two dies. The alignment data 552 is also usable by the nozzle data mapper 520 to determine whether the nozzle firing data for the odd rows of print nozzles and firing data for the even rows of print nozzles for a die are to be swapped. In some examples, the alignment data 552 is further usable by the serpentine direction reverser 170 to determine whether, and when, to reverse the serpentine direction of halftoning. Such examples are associated with the first criterion, and with the halftoning technique that halftones print data image pixels in the reverse serpentine direction where these pixels correspond to print nozzles of a die on which the firing data for the odd rows of nozzles and the even rows of nozzles are swapped.

Figure 6:
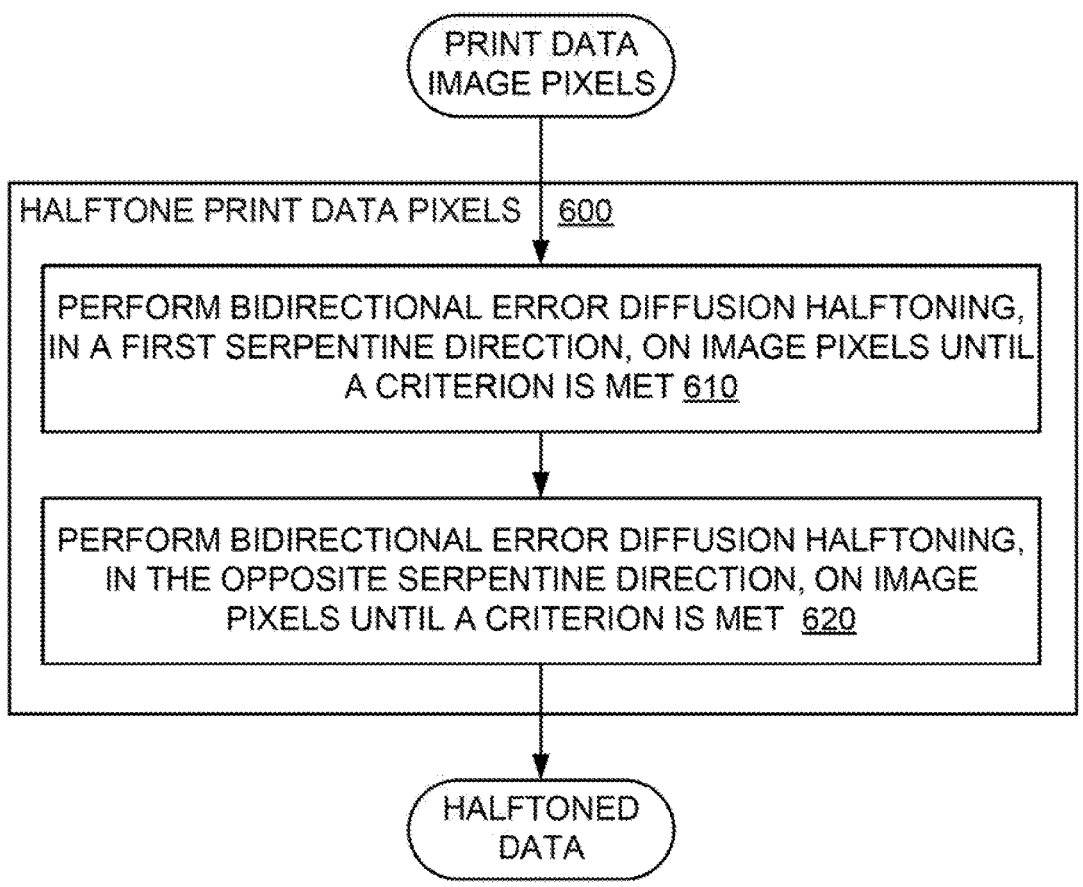
FIG. 6 is a flowchart according to an example of the present disclosure of a method for halftoning print data image pixels for printing usable with the printers of FIGS. 1 and 5.

Considering now a method for halftoning print data image pixels, and with reference to FIG. 6, a method 600 begins, at 610, by performing bidirectional error diffusion halftoning in a first serpentine direction on the pixels until a criterion is met. At 620, the method 600 performs the bidirectional error diffusion halftoning in an opposite serpentine direction on the pixels after the criterion is met. In some examples, the print data image pixels are provided in, or interpreted as, a row-and-column array format. In a first example, as discussed heretofore with reference to FIG. 4, the criterion may be the swapping of even and odd row firing data on a die. In a second example, and also as discussed heretofore with reference to FIG. 4, the criterion may be the number of print nozzles for which print data image pixels mappable to firing data for those nozzles have been halftoned in the present serpentine direction. In some examples, the method 600 may be performed by the printer 100 (FIG. 1) and/or printer 500 (FIG. 5), specifically in some cases by the halftoner 160.

Figure 7:
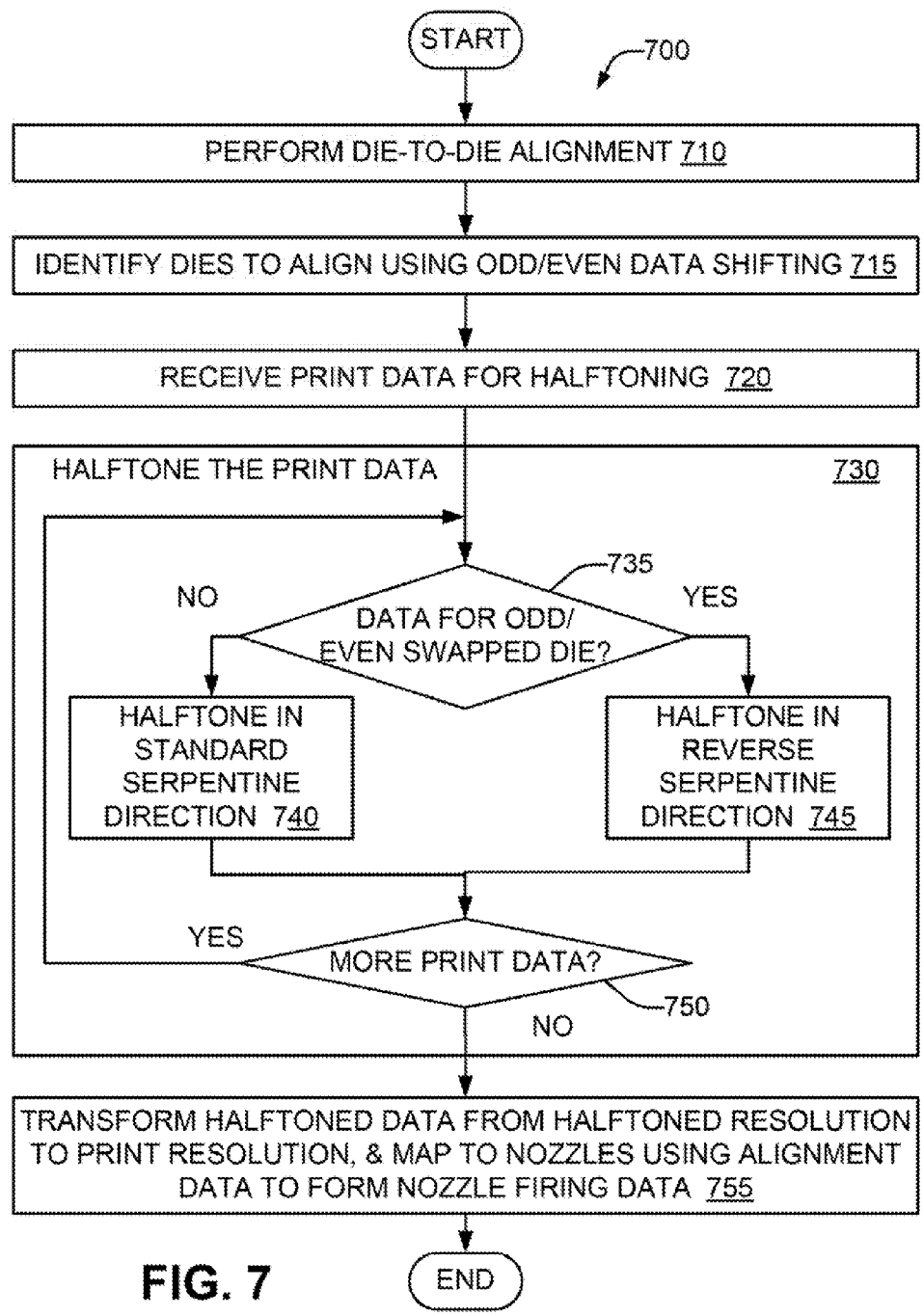
FIG. 7 is another flowchart according to an example of the present disclosure of a method for halftoning print data image pixels for printing usable with the printers of FIGS. 1 and 5.

Considering now another method for halftoning print data image pixels, and with reference to FIG. 7, a method 700 begins, at 710, by performing a die-to-die alignment procedure. At 715, dies which are aligned through the use of data shifting between odd and even nozzle rows are identified. At 720, print data image pixels are received for halftoning. In some examples, the print data image pixels are an entire page of print data. At 730, the received print data image pixels are halftoned. Halftoning is performed at a halftone resolution. At 755, the halftoned data is transformed from the halftone resolution to the print resolution of the printer to form nozzle firing data for the printbar.

Considering the operation of 730 in greater detail, at 735 it is determined whether the print data image pixel(s) currently being halftoned correspond to print nozzle(s) of a die for which odd rows and even rows of firing data are to be swapped. If not ("No" branch of 735), then at 740 the current pixel(s) are halftoned in a standard serpentine direction. If so, ("Yes" branch of 735), then at 745 the current pixel(s) are halftoned in the reverse serpentine direction, which is opposite the standard serpentine direction. If more print data image pixels remain to be halftoned ("Yes" branch of 750), then operation continues at 735. If no more print data image pixels remain to be halftoned ("No" branch of 750), then operation continues at 755. In some examples, the method 700 may be performed by the printer 100 (FIG. 1) and/or printer 500 (FIG. 5).

Figure 8:
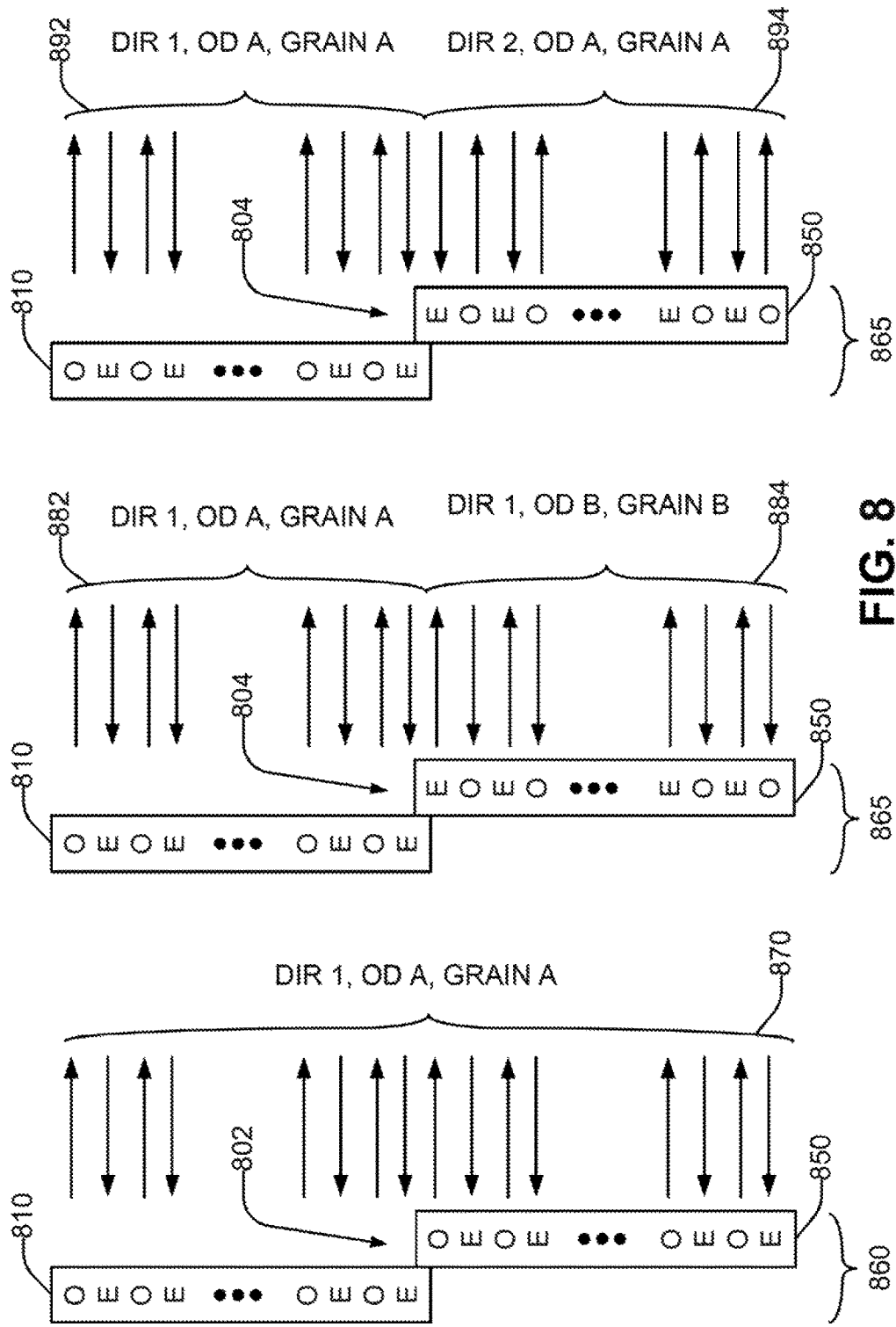
FIG. 8 is a schematic illustration in accordance with an example of the present disclosure of the halftoning operation for an example printbar according to the method of FIG. 7.

Considering now an example of halftoning operation of the method 700, and with reference to FIG. 8, consider two adjacent dies of a printbar, die 810 and die 850. In a first alignment state 860, dies 810, 850 are aligned such that, at a die-to-die boundary 802, the last operating nozzle of die 810 is in a different row from the first operating nozzle of die 850. As illustrated, the last operating nozzle of die 810 is disposed in an even ("E") row, while the first operating nozzle of die 850 is disposed in an odd ("O") row. Alternatively, for the first alignment state, the last operating nozzle of die 810 could be disposed in an odd ("O") row, and the first operating nozzle of die 850 in an even ("E") row.

In a second alignment state 865, dies 810, 850 are aligned such that, at a die-to-die boundary 804, the last operating nozzle of die 810 is in the same row as the first operating nozzle of die 850. As illustrated, the last operating nozzle of both die 810 and die 850 are disposed in an even ("E") row. Alternatively, for the second alignment state, the last operating nozzle of both die 810 and die 850 could be disposed in an odd ("O") row.

FIG. 8 also illustrates the direction in which the image pixels for each nozzle are halftoned, in the case of a P/H=1 relationship between the halftoning resolution and the printing resolution. For the first alignment state 860, the image pixels for both dies 810, 850 are all halftoned in the same serpentine direction (direction "1"). In this serpentine direction configuration, the image pixels corresponding to all odd nozzles are halftoned in one direction, and the image pixels corresponding to all even nozzles are halftoned in the opposite direction. Print output for the entire region 870 of the media that is spanned by dies 810, 860 has the same optical density ("A"), and the same grain ("A").

For the second alignment state 865, the image pixels for both dies 810, 860 again are all halftoned in the same serpentine direction 870 (direction "1"). However, due to the data swapping on die 850, the image pixels corresponding to the odd nozzles of die 810 are halftoned in the opposite direction from the odd nozzles of die 850, and the image pixels corresponding to the even nozzles of die 810 are halftoned in the opposite direction from the even nozzles of die 850. As a consequence, print output for the region 882 of the media that is spanned by die 810 has a first optical density ("A") and grain ("A"), while the print output for the region 884 of the media that is spanned by die 850 has a second optical density ("B") and grain ("B"). The differences in optical density and grain between the region printed by die 810 and the region printed by die 850 cause a human-perceivable degrading of the print output image quality.

A reversal in the serpentine direction of halftoning between dies 810, 850 in the second alignment state 865 eliminates this print output image quality degradation. The image pixels for nozzles of die 810 are halftoned in a first serpentine direction (direction "1"), and the image pixels for nozzles of die 850 are halftoned in the reverse serpentine direction (direction "2"). As a consequence, the image pixels corresponding to all odd nozzles on both dies 810, 850 are halftoned in one direction, and the image pixels corresponding to all even nozzles on both dies 810, 850 are halftoned in the opposite direction. The print output for the region 892 of the media that is spanned by dies 810 and halftoned in the first serpentine direction (direction "1") has a first optical density ("A") and grain ("A"), while the print output for the region 894 of the media that is spanned by die 850 and halftoned in the reverse serpentine direction (direction "2") also has the first optical density ("A") and grain ("A").

Figure 9:
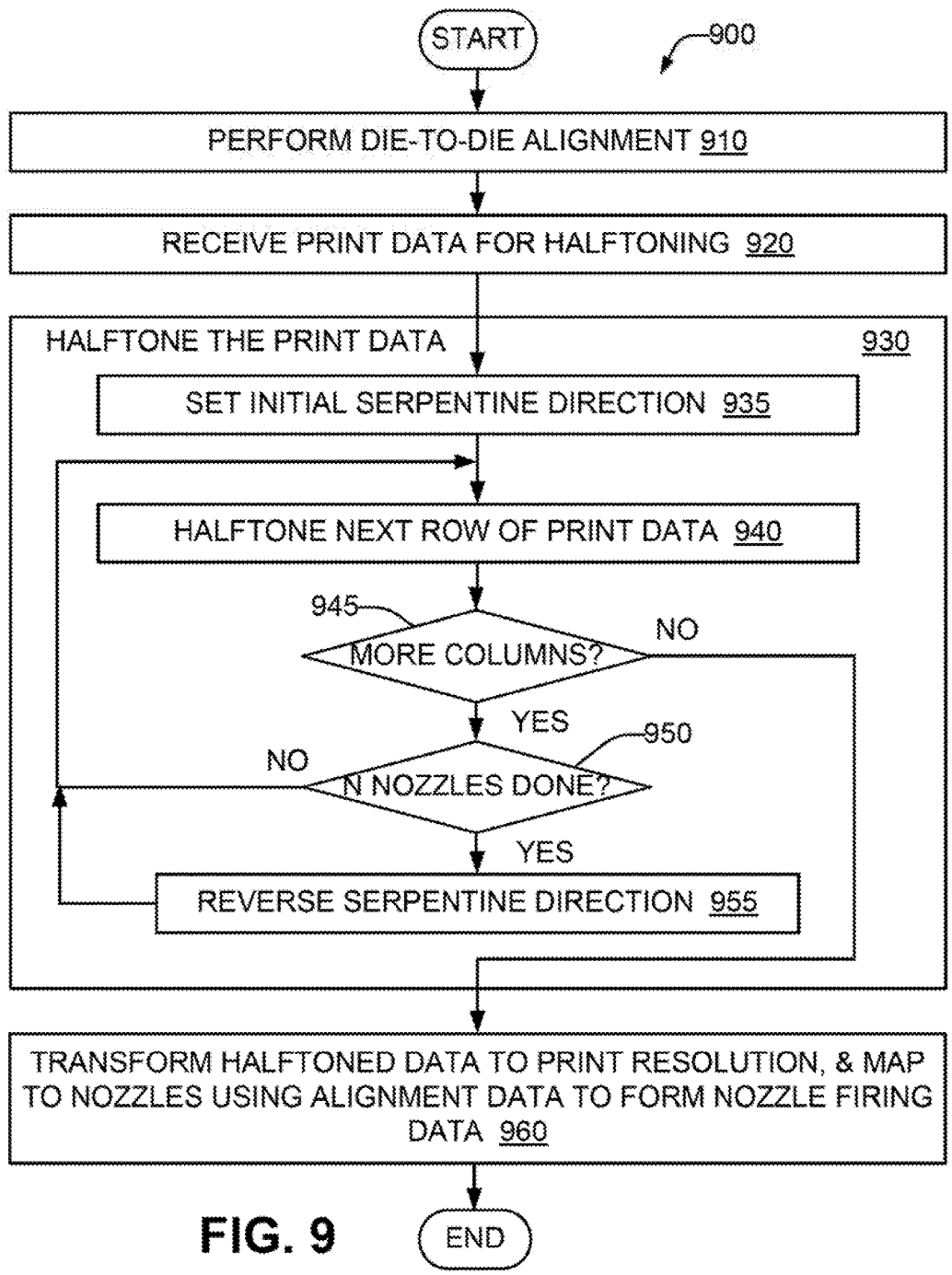
FIG. 9 is another flowchart according to an example of the present disclosure of a method for halftoning print data image pixels for printing usable with the printers of FIGS. 1 and 5.

Considering now yet another method for halftoning print data image pixels, and with reference to FIG. 9, a method 900 begins, at 910, by performing a die-to-die alignment procedure. At 920, print data image pixels are received for halftoning. In some examples, the print data image pixels are an entire page of print data. At 930, the received print data image pixels are halftoned. Halftoning is performed at a halftone resolution. At 960, the halftoned data is transformed from the halftone resolution to the print resolution of the printer to form nozzle firing data for the printbar.

Considering the operation of 930 in greater detail, at 935 an initial serpentine direction of halftoning is set. This may be the standard serpentine direction, or serpentine direction "1". At 940, the next row of print data image pixels are halftoned in the current serpentine direction. At 945, if there are no more columns of image pixels to be halftoned ("No" direction of 945), then operation continues at 960. If there are more columns of image pixels to be halftoned ("Yes" direction of 945), then at 950 it is determined whether image pixels corresponding to the predetermined number N of print nozzles of the printbar have been halftoned in the present serpentine direction since the last serpentine direction reversal. If not ("No" branch of 950), then operation continues at 940. If so ("Yes" branch of 950), then at 955 the serpentine direction of halftoning is reversed from the present serpentine direction, and operation continues at 940. If the present serpentine direction is the standard direction or direction "1", then the serpentine direction is reversed to the opposite direction (in this case, to the reverse direction or direction "2"). If the present serpentine direction is the reverse direction or direction "2", then the serpentine direction is reversed to the opposite direction (in this case, to the standard direction or direction "1"). In some examples, the method 900 may be performed by the printer 100 (FIG. 1) and/or printer 500 (FIG. 5).

Considering now an example of halftoning operation of the method 900, and with reference to FIG. 10, consider two adjacent dies of a printbar, die 1010 and die 1050. In a first alignment state 1060, dies 1010, 1050 are aligned such that, at a die-to-die boundary 1-02, the last operating nozzle of die 1010 is in a different row from the first operating nozzle of die 1050. As illustrated, the last operating nozzle of die 1010 is disposed in an even ("E") row, while the first operating nozzle of die 1050 is disposed in an odd ("O") row. Alternatively, for the first alignment state, the last operating nozzle of die 1010 could be disposed in an odd ("O") row, and the first operating nozzle of die 1050 in an even ("E") row.

In a second alignment state 1065, dies 1010, 1050 are aligned such that, at a die-to-die boundary 1004, the last operating nozzle of die 1010 is in the same row as the first operating nozzle of die 1050. As illustrated, the last operating nozzle of both die 1010 and die 1050 are disposed in an even ("E") row. Alternatively, for the second alignment state, the last operating nozzle of both die 1010 and die 1050 could be disposed in an odd ("O") row.

FIG. 10 also illustrates the direction in which the image pixels for each nozzle are halftoned, in the case of a P/H=1 relationship between the halftoning resolution and the printing resolution. In the example, the value of S (the number of serpentine direction segments desired in each die of FIG. 10) is set to 2, for simplicity of illustration. Assume that D (the total number of nozzles in each individual die of the printbar) is 512. Then the value for N (the predetermined number of print nozzles of the printbar to be halftoned in the present serpentine direction before the serpentine direction is to be reversed) is calculated according to D/S, which yields 256. Since N is an integer value, a serpentine direction reversal will happen to coincide with the die-to-die boundaries 1002, 1004.

For the first alignment state 1060, the image pixels which correspond to the top 256 nozzles of die 1010 are halftoned in one serpentine direction (direction "1"). At this point, the serpentine direction reverses, and the bottom 256 nozzles of die 1010 are halftoned in the opposite serpentine direction (direction "2"). The same pattern repeats in die 1050. Print output for regions 1072, 1076, which were halftoned in serpentine direction "1", has optical density ("A") and grain ("A"). Print output for regions 1074, 1078, which were halftoned in serpentine direction "2", has optical density ("B") and grain ("B").

For the second alignment state 1065, the image pixels which correspond to the top 256 nozzles of die 1010 are halftoned in one serpentine direction (direction "1"). At this point, the serpentine direction reverses, and the bottom 256 nozzles of die 1010 are halftoned in the opposite serpentine direction (direction "2"). The same pattern repeats in die 1050. Print output for region 1082, which was halftoned in serpentine direction "1", has optical density ("A") and grain ("A"), and print output for region 1084, which was halftoned in serpentine direction "2", has optical density ("B") and grain ("B"). Thus the print output for die 1010 is the same in both alignment states 1060, 1065. However, the difference in alignment of die 1050 between alignment state 1060 and alignment state 1065 produces differences in print output for die 1050. In the second alignment state 1065, print output for region 1086, which was halftoned in serpentine direction "1", has optical density ("B") and grain ("B"), while print output for region 1088, which was halftoned in serpentine direction "2", has optical density ("A") and grain ("A").

The print output image quality degradation which would occur if there were no serpentine direction reversal during halftoning is reduced with the behavior illustrated in FIG. 10. Dividing each die 1010, 1050 into segments, and reversing the serpentine direction of halftoning for each segment, tends to average out the effect of some regions with optical density A and grain A and other regions with optical density B and grain B. As mentioned heretofore, in some examples the optimal number of segments S per die ranges between four and eight.

From the foregoing it will be appreciated that the printers and methods provided by the present disclosure represent a significant advance in the art. Although several specific examples have been described and illustrated, the disclosure is not limited to the specific methods, forms, or arrangements of parts so described and illustrated. This description should be understood to include all novel and non-obvious combinations of elements described herein, and claims may be presented in this or a later application to any novel and non-obvious combination of these elements. The foregoing examples are illustrative, and no single feature or element is essential to all possible combinations that may be claimed in this or a later application. Terms of orientation and relative position (such as "top," "bottom," "side," and the like) used herein are not intended to require a particular orientation of any element or assembly, and are used only for convenience of illustration and description. Unless otherwise specified, steps of a method claim need not be performed in the order specified. Similarly, blocks in diagrams or numbers (such as (1), (2), etc.) should not be construed as steps that must proceed in a particular order. Additional blocks/steps may be added, some blocks/steps removed, or the order of the blocks/steps altered and still be within the scope of the disclosed examples. Further, methods or steps discussed within different figures can be added to or exchanged with methods or steps in other figures. Further yet, specific numerical data values (such as specific quantities, numbers, categories, etc.) or other specific information should be interpreted as illustrative for discussing the examples. Such specific information is not provided to limit examples. The disclosure is not limited to the above-described implementations, but instead is defined by the appended claims in light of their full scope of equivalents. Where the claims recite "a" or "a first" element of the equivalent thereof, such claims should be understood to include incorporation of one or more such elements, neither requiring nor excluding two or more such elements. Where the claims recite "having", the term should be understood to mean "comprising".

What is claimed is:
1. A printer, comprising:
    a printbar having at least two dies, each die having parallel odd and even rows of staggered print nozzles, the plural dies partially overlapping in the direction of the rows; and
    a bidirectional error diffusion halftoner structured to generate halftoned data mappable into firing data for the print nozzles and having a serpentine direction reverser structured to
        halftone image pixels in a first serpentine direction to form the halftoned data until a criterion is met, and
        halftone image pixels in an opposite serpentine direction to form the halftoned data after the criterion is met.

2. The printer of claim 1,
wherein a die is aligned such that the firing data for the odd rows of print nozzles and firing data for the even rows of print nozzles for that die are swapped, and
wherein the criterion is that the image pixels being haiftoned correspond to at least some print nozzles of that die.

3. The printer of claim 1, wherein the criterion is that image pixels corresponding to a predetermined number of print nozzles of the printbar have been halftoned in the present serpentine direction.

4. The printer of claim 3, wherein D is the number of nozzles in a die, and wherein the predetermined number is between D/4 and D/8.

5. The printer of claim 3, wherein the bidirectional error diffusion halftoner is further structured to alternate between the first and the opposite serpentine directions whenever the predetermined number of print nozzles of the printbar have been halftoned in the present serpentine direction since the last serpentine direction reversal.

6. The printer of claim 1, wherein the nozzles are disposed along each row at a nozzle-to-nozzle spacing, comprising:
a nozzle data mapper coupled to the halftoner and the printbar and structured to transform the halftoned data at a halftoning resolution into the firing data at a printing resolution, the mapper further structured to swap the firing data of the odd and even rows of a die when the die is aligned in the direction of the rows to an adjacent die such that, the operating nozzle in each die closest to a die-to-die boundary between the two dies are both disposed in even rows or both disposed in odd rows.

7. The printer of claim 1, wherein each die has a mean print nozzle drop trajectory error in a direction orthogonal to the row direction, and wherein the generated halftone data reduces or eliminates print image quality degradation due to the trajectory error.

8. The printer of claim 1, comprising:
a print engine structured to align the dies in the direction of the rows by generating alignment data usable to select endmost operating nozzles of each two dies to define a die-to-die boundary therebetween and to determine whether the firing data for the odd row of print nozzles and firing data for the even row of print nozzles for a die are to be swapped.

9. A method for halftoning print data pixels of a page in a row-and-column format for printing, comprising:
performing bidirectional error diffusion haiftoning, in first serpentine direction, on the pixels until a criterion is met; and
performing the bidirectional error diffusion halftoning, in an opposite serpentine direction, on the pixels after the criterion is met.

10. The method of claim 9, where the criterion comprises:
completing halftoning in the first serpentine direction of pixels corresponding to a predetermined number of adjacent print nozzles.

11. The method of claim 9, where the criterion comprises:
completing halftoning of pixels at a boundary between a first die, and an adjacent second die aligned with the first die such that an operating nozzle in each die closest to a die-to-die boundary between the two dies are both disposed in even rows or both disposed in odd rows in the dies.

12. The method of claim 11,
wherein the odd and even nozzle arrays are staggered along an array axis to print at a printing resolution P,
wherein the pixels are halftoned at a resolution H along the array axis, and
wherein P/H is an odd value.

13. The method of claim 9, wherein each pixel comprises contone print data specific to a set of colorants for an associated printer.

14. A non-transitory computer-readable storage medium having an executable program stored thereon for generating firing data for print nozzles of a printbar of a page-wide printer using bidirectional error diffusion halftoning, wherein the program instructs a processor to:
for each die in the printbar, determine whether to swap the firing data for odd and even rows of the print nozzles of the die in order to align the die in the printbar;
first halftone, in a standard serpentine direction, print data pixels corresponding to a die to which the nozzle firing data is not swapped;
second halftone, in an opposite serpentine direction, print data pixels corresponding to a die to which the nozzle firing data is swapped; and
map halftoned data produced by the first and second halftoning into the firing data.

15. The medium of claim 14, wherein each pixel comprises contone image data specific to a set of colorants of the page-wide printer.

* * * * *